United States Patent [19]
MacTaggart et al.

[11] Patent Number: 5,374,927
[45] Date of Patent: Dec. 20, 1994

[54] BIT-SERIAL DECODER FOR A SPECIALLY ENCODED BIT STREAM

[75] Inventors: Iain R. MacTaggart, Eden Prairie; David E. Tetzlaff, Minnetonka, both of Minn.

[73] Assignee: Honeywell Inc., Minneapolis, Minn.

[21] Appl. No.: 995,440

[22] Filed: Dec. 23, 1992

[51] Int. Cl.$^5$ ............................................. H03M 5/08
[52] U.S. Cl. ...................................................... 341/53
[58] Field of Search ........................ 341/53, 52, 50, 51, 341/64

[56] References Cited

U.S. PATENT DOCUMENTS

| | | | |
|---|---|---|---|
| 3,760,412 | 9/1973 | Barnes | 341/53 |
| 4,032,915 | 6/1977 | Shanks et al. | 341/53 |
| 4,312,070 | 1/1982 | Coombes et al. | 371/40 |
| 4,425,645 | 1/1984 | Weaver et al. | 371/47 |
| 4,501,000 | 2/1985 | Immink et al. | 375/25 |
| 4,592,072 | 5/1986 | Stewart | 375/55 |
| 4,951,049 | 8/1990 | Whitfield | 341/64 |
| 4,954,825 | 9/1990 | Chi | 341/64 |
| 5,042,053 | 8/1991 | Hoppes | 375/106 |
| 5,073,905 | 12/1991 | Dapper et al. | 375/106 |

OTHER PUBLICATIONS

M. Banu and A. E. Dunlap, "Clock Recover Circuits With Instantaneous Locking", published Nov. 5, 1992 in the Electronic Letters.

*Primary Examiner*—Sharon D. Logan
*Attorney, Agent, or Firm*—Kenneth J. Johnson

[57] ABSTRACT

A method and apparatus for decoding a specially encoded bit stream without the use of an external clock. A bit stream is encoded so that the relative lengths of the pulse widths between the transitions in the bit stream are indicative of the type bit being transmitted. A decoder receives the bit stream, measures the lengths of the pulses between the transitions, determines the type of bit by comparing the lengths, and stores the bit in a shift register. The bits can then be output in parallel form.

15 Claims, 5 Drawing Sheets

BIT-SERIAL DECODER FOR A SPECIALLY ENCODED BIT STREAM

FIELD OF THE INVENTION

This invention relates to data processing systems, and more specifically, to a system for decoding a specially encoded digital bit stream which is transmitted within a digital data communication system.

BACKGROUND OF THE INVENTION

Digital information is commonly transmitted between different data processing systems via an electronic signal. The information is encoded in a series of high and low pulses which are transmitted, decoded, and stored in temporary memory registers.

When digital information is transmitted via a serial bit stream, difficulties may be encountered in finding the proper means to decode information. One decoding method provides a clock signal which controls at what intervals the bit stream is read or sampled. In most cases the pulses from a voltage control oscillator are used as a clock. Every time a pulse is output from the oscillator, a reading is taken from the bit stream.

In systems which use a clock signal to decode, means must be provided to synchronize the clock signal with the incoming bit stream. This can be done by including a preamble in the bit stream. The preamble is located at the beginning of the bit stream and contains a series of test signals which align the clock with the incoming data. If the bit stream and the clock are not properly synchronized, data will be read at the wrong time, possibly causing multiple bit errors. Once the clock and the incoming data are properly aligned, the actual data is read at intervals controlled by the voltage controlled oscillator.

Any system which uses clock signals to control the reading of incoming data may be susceptible to bit errors due to noise or frequency changes which may appear in the signal of the digital bit stream. Noise or frequency variations in the bit stream can cause the data and the clock to become misaligned, which in turn causes bit errors. Also, a preamble degrades link latency when multiple sources are to be received, thus slowing the system.

Another type of prior art system includes the timing signal in the digital bit stream itself. The decoder has an internal clock and means are provided to synchronize this clock with timing signal in the bit stream. This system has the same drawbacks as the system described above in that an external clock is still needed to read the data, and valuable computer time is used in synchronizing the clock and the data.

Thus there is a need to provide a digital bit stream decoder which does not rely on an external clock signal or the need to synchronize a clock with the incoming data.

SUMMARY

Therefore there is provided a method for decoding a digital bit stream in which no external clocking signals are required. In this method, the incoming bit stream is encoded so that each bit is represented by multiple transitions in the bit stream. The relative widths of the alternating high and low pulses between transitions indicate whether the bit is a "1" or a "0". For example, a long high pulse width followed by a short low pulse width could indicate "1" bit and a short high pulse followed by a long low pulse could indicate a "0" bit. The bit stream decoder receives the bit stream and measures the widths of the pulses between the transitions. The lengths of the pulses are then compared to determine the type of bit. The decoded bit can be stored and output in either serial or parallel form.

Because the transitions in the bit stream act as the timing mechanism, it is not possible for the system to get out of sync with an external clock. Also, frequency changes in the incoming data will not affect the system because it is the relative widths of the pulses that is important, and not the actual width.

It is an object of this invention to provide a method for decoding a specially encoded digital bit stream.

It is another object of this invention to provide a method for decoding a specially encoded digital bit stream without the use of an external clock signal.

It is still another object of this invention to provide an apparatus for decoding a specially encoded bit stream.

DETAILED DESCRIPTION OF THE PREFERRED EMBODIMENT

Figure 1:
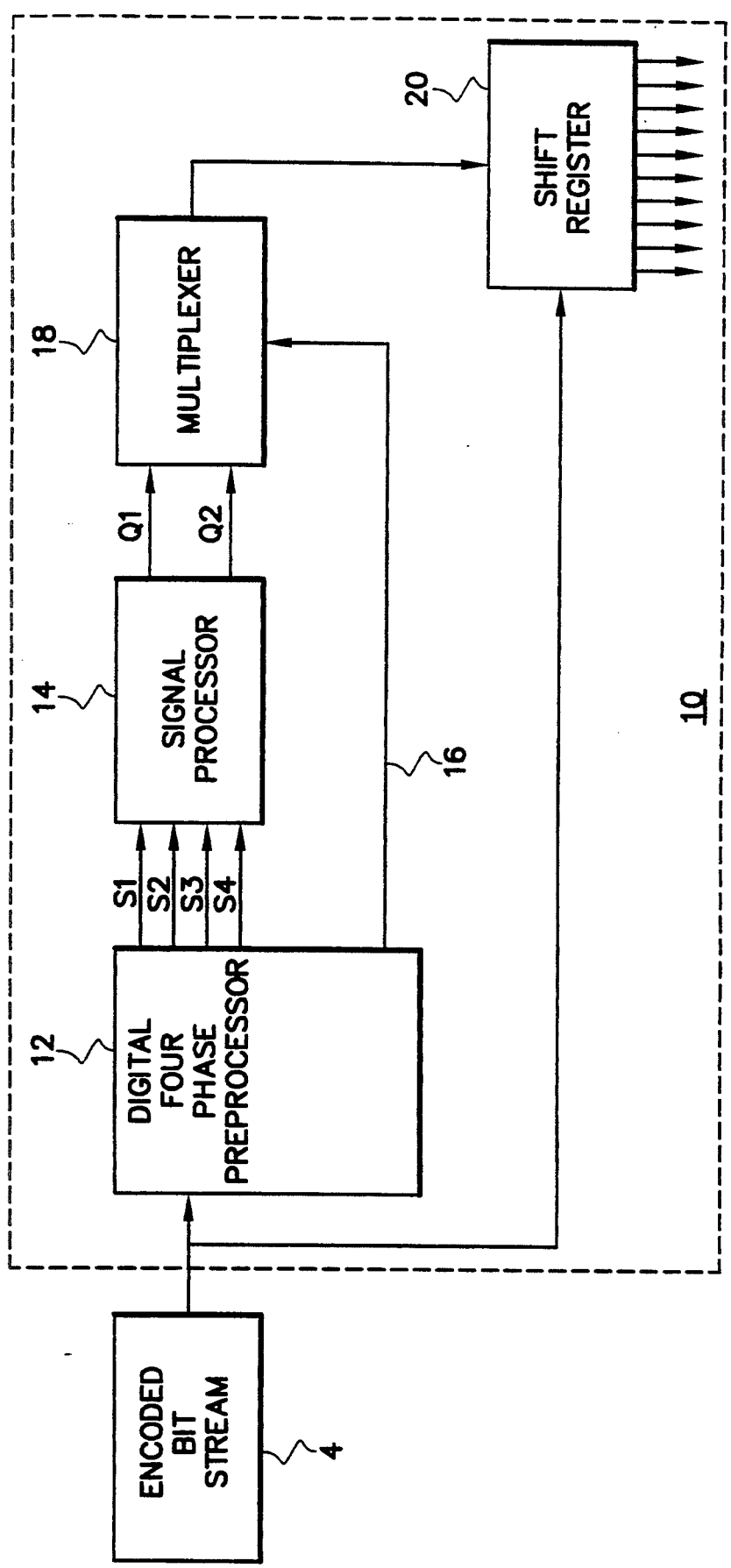
FIG. 1 is a block diagram of the serial bit decoder.

Referring to FIG. 1, there is shown a block diagram of the decoder 10. The encoded bit stream 4 is created remote from the decoder and transmitted to the components of the decoder 10. The four phase digital preprocessor 12 receives the bit stream and outputs signals S1, S2, S3, and S4, as well as a divide-by-two signal 16. The divide-by-two signal 16 is transmitted from the four phase digital preprocessor 12 to the multiplexer 18, while signals S1, S2, S3 and S4 are transmitted from the four phase digital preprocessor 12 to the signal processor 14. The signal processor 14 outputs two separate signals, Q1 and Q2, to the multiplexer 18. The output of the multiplexer 18 runs to the shift register 20 which stores and then outputs the transmitted data. The shift register also receives the encoded bit stream.

Figure 2:
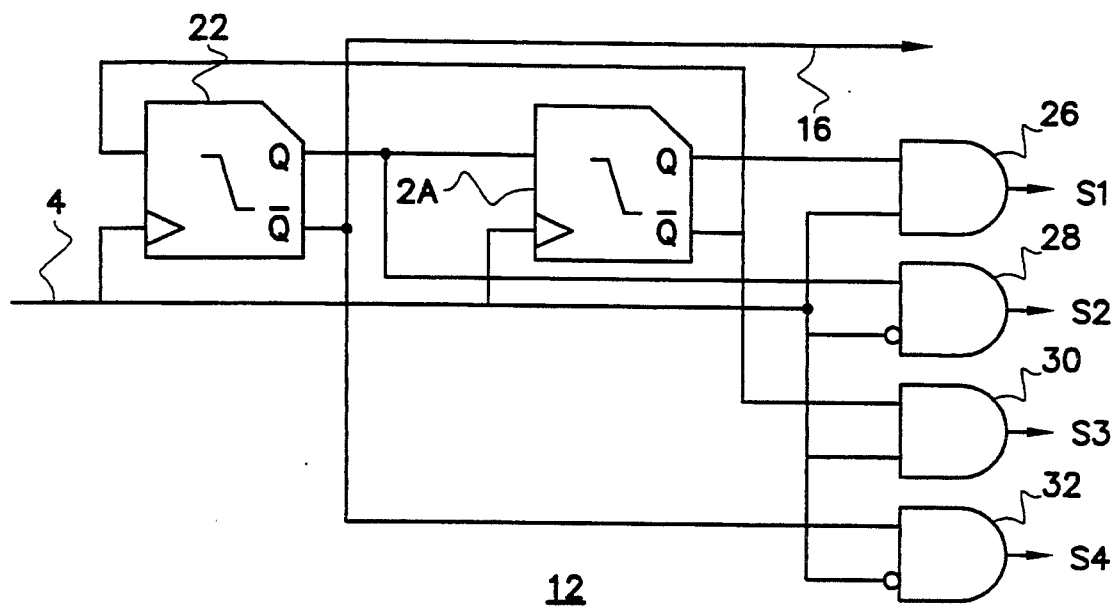
FIG. 2 is a circuit diagram of the four cycle digital preprocessor.

A detailed view of the four phase digital preprocessor 12 is shown in FIG. 2. The four phase digital preprocessor 12 is comprised of two flip-flops, 22 and 24, connected in a master-slave configuration, as well as four AND gates 26, 28, 30 and 32. Each AND gate is connected in the circuit so that one of its inputs receives a signal output from either of the flip-flops and the other input receives the encoded bit stream. As is seen in FIG. 2, one input of AND gate 26 receives the encoded bit stream while the other input receives the output of slave flip-flop 24. One input of AND gate 28 receives the inverse, or complement, of the encoded bit stream while the other input receives the output of master flip-flop 22. One input of AND gate 30 receives the encoded bit stream and the other input receives the output complement of slave flip-flop 24. Finally, one input of AND gate 32 receives the encoded bit stream complement and the other input receives the output complement of master flip-flop 22. The four AND gates 26, 28, 30 and 32 output signals S1, S2, S3, and S4, respectively, to the signal processor 14.

The flip-flops 22 and 24 produce the divide-by-two signal 16. The divide by two signal 16 is an oscillating signal which changes state every time a particular type of transition in the bit stream is detected, for example, a rising edge. The divide-by-two signal is actually the output complement of the master flip-flop 22.

Figure 3:
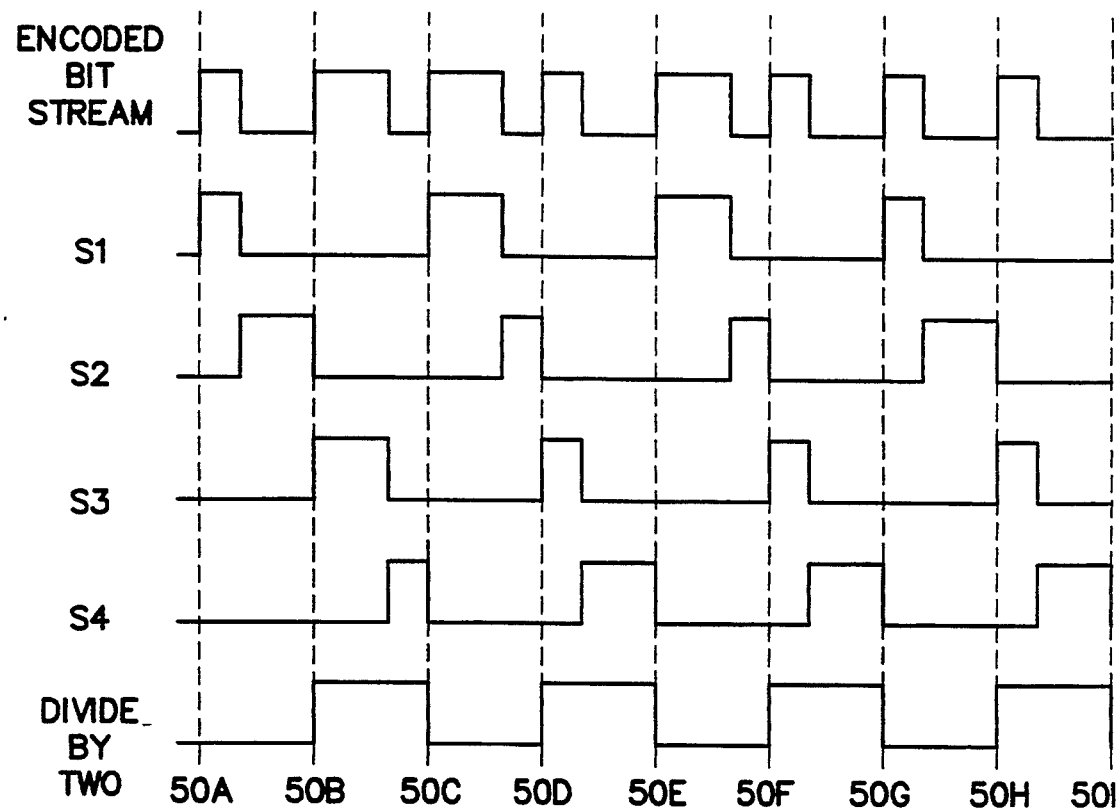
FIG. 3 is a timing diagram of the four cycle digital preprocessor.

The operation of the four phase digital preprocessor can be better understood by analyzing the timing chart in FIG. 3. S1, S2, S3 and S4, as well as the divide-by-two signal 16, are shown matched up time-wise to the encoded bit stream. In time period 50a–50b, it is seen that the S1 goes high in response to the encoded bit stream being high. When the bit stream goes low during this time period, S2 goes high. In time period 50b–50c, S3 will be high as long as the bit stream remains high, and S4 will remain high as long as the bit stream remains low. The cycle then begins again at 50c and continues through 50i. The divide-by-two signal 16 alternates between high and low on every rising edge in the encoded bit stream.

Figure 4:
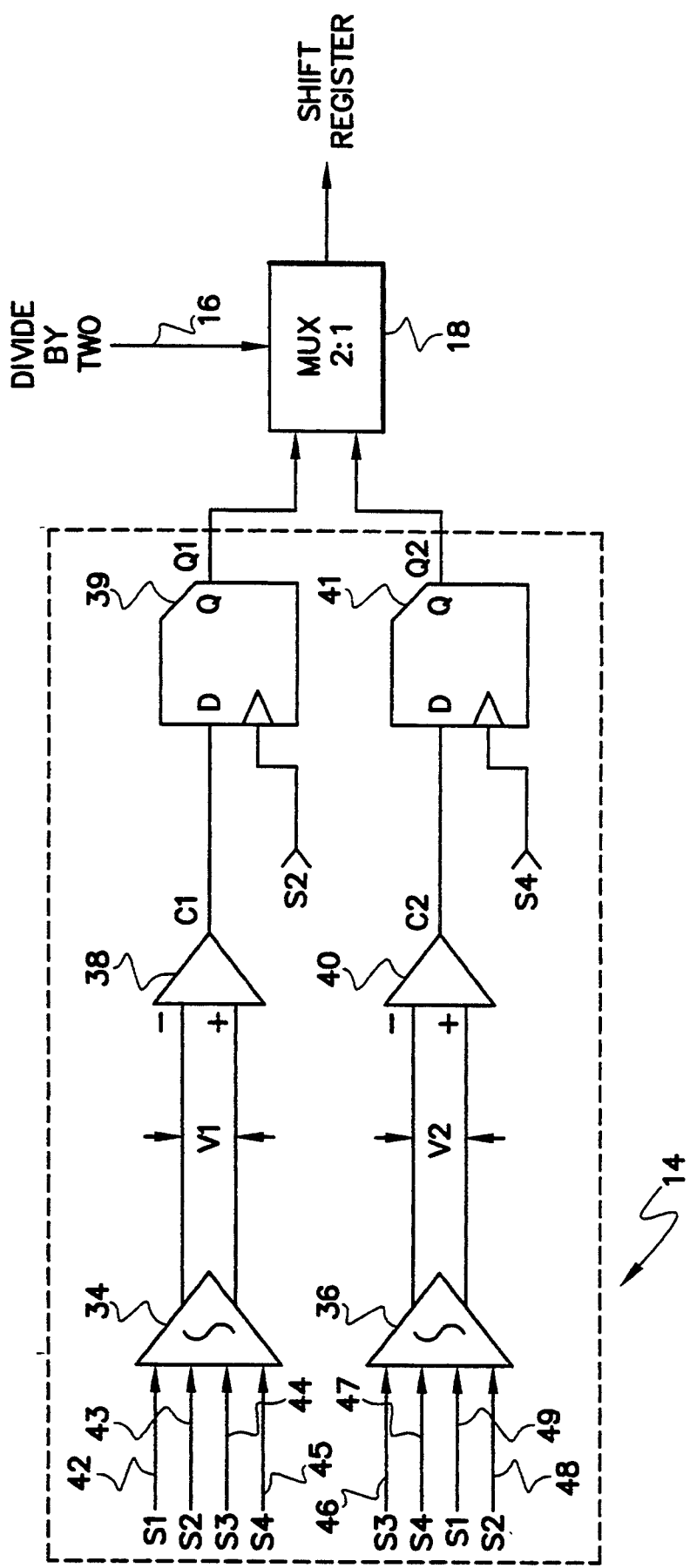
FIG. 4 is a block diagram of the signal and the 2:1 multiplexer processor.

The signal processor 14 is shown in more detail in FIG. 4. The signal processor 14 is comprised of two differential voltage integrators 34 and 36, two differential comparators 38 and 40, and two latches 39 and 41. Each differential voltage integrator receives S1, S2, S3 and S4 and outputs a differential voltage which runs to either comparator 38 or 40. The output C1 of comparator 38 runs to latch 39 while the output C2 of comparator 40 runs to latch 41. The outputs Q1 and Q2 of the latches run to the multiplexer 18. Differential voltage integrator 34 has four inputs, 42, 43, 44, and 45, while differential voltage integrator 36 has four inputs 46, 47, 48, and 49. The purpose of the integrators 34 and 36 is to output a differential voltage which either ramps up or down in response to the input signals S1–S4. For example, a high signal at input 42 will cause the differential voltage integrator 34 to ramp up. When the signal at input 42 goes low and the signal at input 43 goes high, the increase of the differential voltage stops and the voltage integrator 34 ramps down at the same rate it had ramped up. A high signal at either input 44 or 45 will cause the integrator 34 to discharge and reset. The operation of the integrator 36 is substantially the same as integrator 34. High signals at inputs 46 and 47 will cause the integrator to output either an increasing or decreasing differential voltage, while high signals at 48 and 49 will cause the integrator 36 to discharge and reset.

Figure 5:
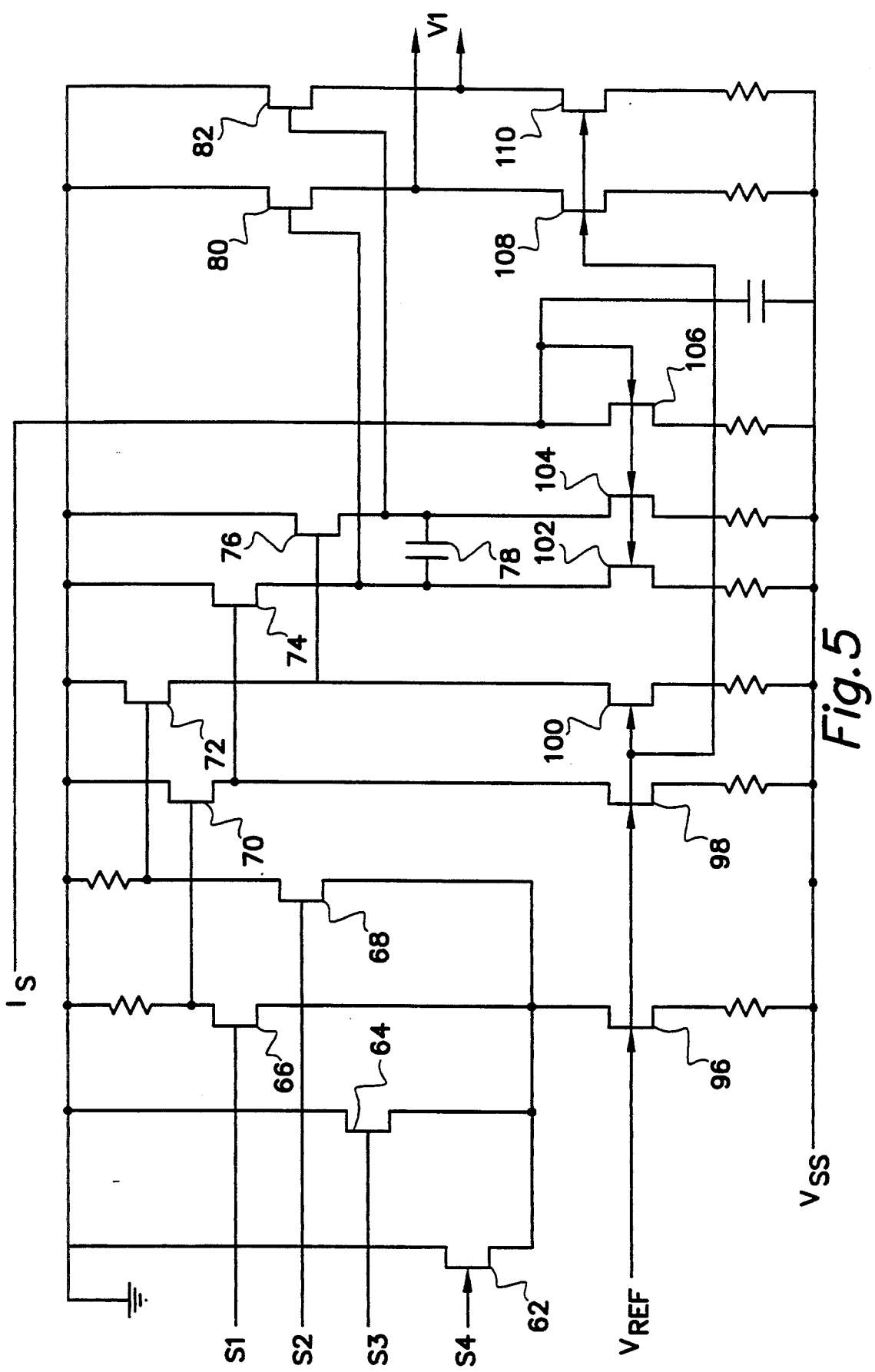
FIG. 5 is a circuit diagram of a differential integrator.

A circuit diagram for voltage integrator 34 is shown in FIG. 5. As can be seen, S3 is input into the gate of field effect transistor (FET) 64, while S4 is input into the gate of FET 62. S1 and S2 are input into the gates of FET's 66 and 68, respectively. The drains of FET's 66 and 68 are connected to the gates of FET's 70 and 72, respectively. The sources of FET's 70 and 72 are connected to the gates of FET's 74 and 76, respectively. The source of FET 76 runs to one plate of capacitor 78, while the source of FET 74 runs to the other plate. The gates of FET's 80 and 82 are also connected across the capacitor 78. The sources of FET's 80 and 82 carry the output V1. FET's 96–110, act as current mirrors for the integrator circuit as well as constant current sources. FET's 96–100 and 108–110 receive $V_{ref}$ at each of their gates, while FET's 102–106 receive $I_S$ at their gates. Voltage source $V_{SS}$ is always below ground, typically about 5 volts in order to ensure proper operation of the circuit.

The circuit for differential voltage integrator 36 is nearly identical to the one shown in FIG. 5. The only difference being that S3 runs to the gate of FET 66, S4 runs to the gate of FET 68, S1 runs to the gate of FET 64, and S2 runs to the gate of FET 62.

The operation of voltage integrator 34 is as follows. As S1 goes high, FET 65 is turned on. This causes the drain of FET 55 to go low, which turns off FET 70. If FET 70 is not conducting, FET 74 will not conduct current to the capacitor 78. Meanwhile, S2 is low, which will keep FET 68 turned off. The high signal at the drain of FET 58 will turn on FET 72, which will then turn on FET 75. Current will then be conducted to capacitor 78. The building potential across capacitor 78 is sensed at the gates of FET's 80 and 82. A differential voltage across the capacitor 7 8 will continue to increase at a constant rate as long as S1 remains high. The FET's 80 and 82 will respond to the voltage difference and output the differential voltage signal V1. The differential voltage will be proportional to the potential across the capacitor 78. The differential voltage will continue to ramp up until S1 goes low and S2 goes high.

When S2 goes high, FET 68 will turn on and FET 66 will turn off. FET's 70 and 74 will turn on. FET's 72 and 76 will turn off. Because FET 74 is now conducting, the potential across the capacitor 78 will decrease at the same rate with which it had originally increased. FET's 80 and 82 will sense the voltage difference across the capacitor 78 and the differential voltage V1 will decrease at a constant rate.

When either signal S3 or S4 is high, the capacitor 78 will discharge. Depending on which signal is high, either FET 63 or 64 will turn on stealing current from the rest of the circuit. Because FET's 66, 68, 70, 72, 74, and 76 remain off, the voltage across the capacitor 78 will be zero, allowing it to discharge.

$I_S$ is a variable current generated by a remote power source. Input $I_S$ to FET's 102, 104 and 105 allows the user of the system to control the rate at which the capacitor 78 charges because the rate of voltage change across the capacitor directly affects the accuracy of the system. $I_S$ controls the constant current sources which in turn affect the charging rate of the capacitor 78.

The use of the four phase digital preprocessor 12 allows the differential voltage integrators 34 and 36 to be laid out in a swinging buffer configuration. The swinging buffer allows one of the differential voltage integrators to discharge and reset while the other is operating in the circuit. With the differential voltage integrators 34 and 36 connected in this fashion, there is no interruption in service.

As seen again in FIG. 4, comparators 38 and 40 receive the differential signal from the differential voltage integrators, 34 and 36 respectively, and output a corresponding high or low signal. For example, if either comparator detects a differential voltage which is positive, it will output a high signal. If the differential voltage is negative the comparators will output a low signal.

Latches 39 and 41 receive the output from the comparators. Both latches are of the IRM 12-22-92 transparent type, meaning that the latch output signal is identical to the input signal when the clocking signal is high. However, when the clocking signal is low, the latch output will remain constant regardless of the input signal. Latch 39 receives the clocking signal S2 while latch 41 receives S4. The output from the latches runs to the 2:1 multiplexer 18.

Before the operation of the decoder is described, the encoding of the bit stream will be explained. In one embodiment of the invention, each bit in the bit stream is comprised of three transitions and two pulse widths. The first transition to the second makes up the first pulse width, and the second transition to the third makes up the second pulse width. The relative widths of the pulses will determine what type of bit is being transmitted. For example, if a rising edge indicates the beginning of a bit, the falling edge which follows will separate the low and the high pulse widths. The second rising edge will indicate the end of the present bit and the beginning of the next. In relative terms, if the low pulse width is larger than the high pulse width, the bit is a "0". If the high pulse width is larger than the low pulse width, the bit is a "1". This invention supplies the means to receive the encoded bit stream, determine the type of bit by comparing the pulse widths in each bit of information, and then to output the information in usable form. This is done without the use of a separate clock signal which controls when the system reads the bit stream.

Figure 6:
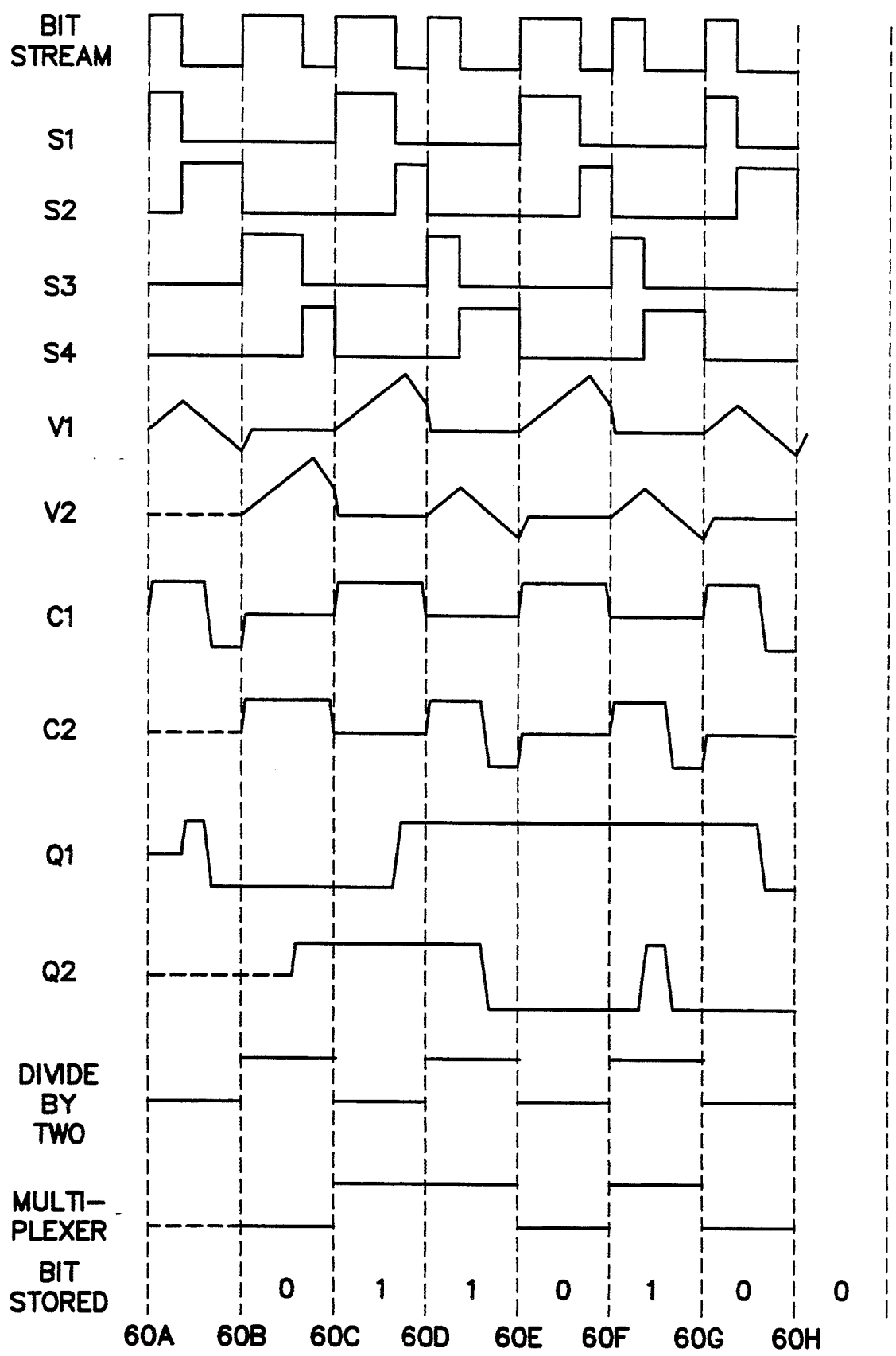
FIG. 6 is a timing diagram for all operations of the serial bit decoder.

The operation of the decoder can be best understood by studying the timing diagram in FIG. 6. In this timing diagram all the signals transmitted within the decoder are shown simultaneously, and with this, one can trace the course of a particular bit from the time it enters the decoder until it is stored in the shift register 20. In this embodiment of the invention the shift register 20 converts the incoming data from serial to parallel and outputs 10 bit words. In the timing diagram, signals V1 and V2 represent the outputs of voltage integrators 34 and 36 respectively, C1 and C2 represent the outputs of comparators 38 and 40 respectively, and signals Q1 and Q2 represent the output of latches 39 and 41, respectively. Also shown is the divide-by-two signal, the multiplexer output, and the type of bit which is stored in the shift register 20.

In time period 60a–60b of FIG. 6, the incoming bit from the bit stream is a short high pulse followed by a long low pulse. This signifies that the encoded bit is a zero. While the incoming bit stream is high, the signal S1 output by the four phase digital preprocessor 12 is also high. When the incoming bit stream goes low for a long pulse width, S2 then goes high. At 60a, the voltage integrator 34 begins to output differential voltage V1. In response to S1 being high, the differential voltage ramps up until S1 goes low. When S2 goes high, V1 ceases to increase and begins ramp down at the same rate. An important aspect of this invention is that the differential voltage ramps up and down at an identical rates so that an accurate representation of the relative sizes of the pulse widths can be made.

During 60a–60b, comparator 38 outputs a high C1 in response to a positive V1. C1 will be high as long as the differential voltage is positive, but will go low when V1 becomes negative. When S2 is high, the latch 39 will output a signal identical to C1. When S2 goes low the latch 39 will lock and output a constant signal equal to C1 just before S2 went low. In time period 60a–60b while S2 is high, the differential voltage is initially positive but eventually goes negative so that at 60b the output of latch 39 is low.

The divide-by-two signal 16 is the control signal for the multiplexer 18. The divide-by-two signal 16 is synchronized with the swinging buffer configuration of the signal processor 14 to continually input information into the shift register 20. The latches output their signal to the multiplexer 18 which then outputs either signal depending on the state of the control signal. The signal output from the multiplexer 18 is then received by the shift register 20. In this embodiment, the rising edges of the encoded bit stream trigger the input of a bit into the shift register 20. When the shift register 20 is full, the bits can then be output.

At 60b the divide-by-two signal transitions from low to high, the high divide-by-two signal will switch the multiplexer 18 so that it outputs signal Q1. At the upward transition of the bit stream at 60b the shift register 20 will read the output of the multiplexer and store a zero. As is seen in FIG. 6, a whole bit period of the encoded bit stream must pass before a bit is stored in the shift register 20.

The next bit of information spans time period 60b–60c. In the encoded bit stream, the high pulse is longer than the low pulse indicating that the bit being transmitted is a one. During the time the incoming bit stream is high, S3 will be high. When the bit stream goes low, S3 will go low and S4 will then go high. While S3 is high, the differential voltage V2 ramps up. Because of the swinging buffer configuration of the voltage integrators a high S3 will also cause integrator 34 to reset. At the moment S3 goes low and S4 goes high, V2 ceases to increase and begins to ramp down at the same rate.

The comparator 40 tracks the output of the integrator 36 and outputs C2 which remains high as long as V2 remains positive, which in this case is for the whole time period of 60b–60c. When S4 goes high, the signal Q2 from latch 41 will match the state of C2 output from the comparator 40. At 60c, the multiplexer outputs signal Q2 so that the shift register reads Q2 and stores a one. This process continues for time periods 60c–60k. The shift register can then output the data as bit words when all the registers are full.

The foregoing is a description of a novel and nonobvious Bit Serial Decoder for a specially encoded bit stream. The applicant does not intend to limit the invention through the foregoing description, but instead define the invention through the claims appended hereto.

We claim:

1. A method for decoding a digital bit stream, wherein the digital bit stream is comprised of a plurality of bits and each of the bits is defined by at least three transitions in the bit stream, comprising the steps of:
   measuring pulse widths between the transitions in each of the bits; and
   comparing the pulse widths in each of the bits and determining a type of bit from relative sizes of the pulse widths.

2. The method of claim 1 wherein each of the bits in the digital bit stream is comprised of three of said transitions.

3. The method of claim 2 wherein:
   detection of a first of the transitions in each of the bits in the bit stream initiates output of a signal which increases in magnitude at a predetermined rate, detection of a second transition in the bit stops the increase in magnitude of the signal and begins a decrease in magnitude of the signal at the predetermined rate, and detection of a third transition stops change in magnitude of the signal; and the magnitude of the signal at the third transition is indicative of a difference in size of the pulse widths in the bit.

4. The method of claim 3 wherein the signal is a differential voltage.

5. An apparatus for decoding a digital bit stream, wherein the digital bit stream is comprised of a plurality of bits and each of the bits is defined by at least three transitions in the bit stream, comprising:

a measuring means for measuring pulse widths between the transitions in each of the bits; and a comparing means for comparing relative sizes of the pulse widths in each of the bits to determine a type of bit.

6. The apparatus of claim 5 wherein the measuring means comprises at least two differential voltage integrators.

7. The apparatus of claim 6 further including a preprocessing means which receives the bit stream and alternately transmits the bits to each of the differential voltage integrators.

8. The apparatus of claim 7 wherein the comparing means comprises at least two comparators each connected to one of the differential voltage integrators.

9. The apparatus of claim 8 further including an output means connected to the comparing means which stores and outputs the bits transmitted from the comparing means.

10. The apparatus of claim 9 wherein the output means comprises a shift register.

11. An apparatus for decoding a digital bit stream, comprising:

a signal preprocessor to receive the bit stream wherein each of the bits in the bit stream is comprised of at least three transitions and relative sizes of pulse widths between the transitions determines a type of bit;

a plurality of integrators connected to said preprocessor;

a plurality of comparators, wherein each of the comparators is connected to one of said signal integrators; and a storage and output register connected to all of said comparators.

12. The apparatus of claim 11 wherein the signal integrators are a differential voltage integrators.

13. The apparatus of claim 12 wherein there are at least two differential voltage integrators.

14. The apparatus of claim 11 wherein the storage and output register is a serial to parallel shift register.

15. The apparatus of claim 13 wherein the signal preprocessor is a four phase digital preprocessor which alternately activates each of the differential voltage integrators in response to the transitions in the bits.

* * * * *